US011053003B2

(12) United States Patent
Adams

(10) Patent No.: US 11,053,003 B2
(45) Date of Patent: Jul. 6, 2021

(54) CYCLOROTOR THRUST CONTROL, TRANSMISSION AND MOUNTING SYSTEM

(71) Applicant: Pitch Aeronautics LLC, West Lafayette, IN (US)

(72) Inventor: Zachary Adams, Boise, ID (US)

(73) Assignee: Pitch Aeronautics LLC, West Lafayette, IN (US)

( * ) Notice: Subject to any disclaimer, the term of this patent is extended or adjusted under 35 U.S.C. 154(b) by 478 days.

(21) Appl. No.: 16/192,737

(22) Filed: Nov. 15, 2018

(65) Prior Publication Data

US 2020/0156783 A1    May 21, 2020

(51) Int. Cl.
*B64C 39/00* (2006.01)
*B64C 27/72* (2006.01)
*B64C 27/605* (2006.01)
*F03D 3/06* (2006.01)

(52) U.S. Cl.
CPC .......... *B64C 39/005* (2013.01); *B64C 27/605* (2013.01); *B64C 27/72* (2013.01); *F03D 3/068* (2013.01)

(58) Field of Classification Search
CPC ... B64C 39/003; B64C 39/005; B64C 39/008; B64C 11/006
See application file for complete search history.

(56) References Cited

U.S. PATENT DOCUMENTS

| 9,346,535 | B1 | 5/2016 | Adams | |
|---|---|---|---|---|
| 10,279,900 | B2* | 5/2019 | Robertson | B64C 39/008 |
| 2007/0200029 | A1* | 8/2007 | Sullivan | B64C 39/005 244/10 |
| 2012/0256042 | A1* | 10/2012 | Altmikus | B64C 39/008 244/17.21 |

OTHER PUBLICATIONS

Hu Yu et al., "The Research on the Performance of Cyclogyro," Sep. 25, 2006, https://arc.aiaa.org/doi/pdf/10.2514/6.2006-7704.
Moble Benedict, "Fundamental Understanding of the Cycloidal-Rotor Concept for Micro Air Vehicle Applications," 2010, https://drum.lib.umd.edu/handle/1903/11257.
Zachry Adams et al., "Design, Development, and Flight Test of a Small-Scale Cyclogyro UAV Utilizing a Novel Cam-Based Passive Blade Pitching Mechanism," Jun. 2013, https://journals.sagepub.com/doi/pdf/10.1260/1756-8293.5.2.145.
Zachry Adams et al "Development of Advanced Blade Pitching Kinematics for Cyclorotors and Cycloturbines" Aug. 2016, https://docs.lib.purdue.edu/dissertations/AAI10170548/.
Zachry Adams et al., "Optimization and Validation of Cycloturbine Blade-Pitching Kinematics Via Flux-Line Theory," May 2018, https://arc.aiaa.org/doi/pdf/10.2514/1 .J056575.
Teju Jarugumilli et al., "Flow Field Studies on a MAV Scale Cycloidal Rotor in Forward Fight", May 2013, https://www.researchgate.net/publication/284900109_Experimental_and_Computational_Flow_Field_Studies_of_a_MAV-scale_Cycloidal_Rotor_in_Forward_Flight.

* cited by examiner

*Primary Examiner* — Richard G Davis

(74) *Attorney, Agent, or Firm* — Stanley J. Gradisar Attorney At Law, LLC; Stanley J. Gradisar

(57) ABSTRACT

A device for controlling the orientation and magnitude of cyclorotor thrust and for providing mechanical power to that cyclorotor including a system of linear actuators to position a cam or eccentric around a geared shaft. The invention includes a frame which supports the main cyclorotor shaft, provides mounting for the linear actuators, and contains the mechanical gearing system.

20 Claims, 6 Drawing Sheets

CYCLOROTOR THRUST CONTROL, TRANSMISSION AND MOUNTING SYSTEM

SUMMARY

This invention provides control of the pitch of cyclorotor blades and a transmission system to power them. These capabilities enable powering and controlling cyclorotor thrust. Linear actuators are used to modify cyclorotor blade pitch kinematics pseudo-sinusoidally in phase and amplitude. This enables the rapid vectoring of cyclorotor thrust in the plane perpendicular to cyclorotor rotation without varying the rotational speed or orientation of the cyclorotor. A transmission including a pinion gear on a motor and a main gear on a cyclorotor shaft is integrated within this system to provide high torque power to the cyclorotor. These transmission and blade pitch control systems are integrated on a frame which translates cyclorotor aerodynamic forces to a flying or marine vehicle.

BACKGROUND

Cyclorotors are fluid propulsion and control devices that convert mechanical rotation into vectorable thrust by fluid acceleration. They incorporate blades 10 whose span is parallel to the cyclorotor axis of rotation, as shown in FIG. 1. As the cyclorotor 100 rotates 39 these blades are oscillated once per revolution so that the individual blade aerodynamic lift 42 produces a net thrust 40 in a unified direction. Altering the function of blade motion changes the thrust direction and magnitude anywhere in the plane perpendicular to the cyclorotor axis of rotation (FIG. 2). This contrasts traditional propulsion systems 38 (helicopter rotors, propellers, jet engines, etc.) that can only produce thrust along their axis of rotation. Certain blade motions can extract power from a moving fluid and in these cases the device is known as a cycloturbine.

Cyclorotors are useful for propulsion, control and aerodynamic lift in aerial and marine applications that require rapid thrust direction control. They are commercially found on tugboats and ferries which leverage this capability for precise docking. Other practical advantages of the cyclorotor include low aerodynamic noise, simple transition between operation in a stationary and moving fluid, efficient thrust production at low Reynolds numbers, and ease of mounting on a planar surface. Researched applications leveraging these characteristics include airship propulsion and control, micro air vehicles, highly maneuverable unmanned aerial vehicles (UAVs), and manned high speed vertical take-off and landing aircraft. Aircraft using cyclorotors as the primary source of lift, propulsion, and control are known as cyclogyros. FIG. 7. shows an example of a quad-rotor cyclogyro 47 and a twin-rotor cyclogyro 48.

Further detailed background on cyclorotors and cycloturbines can be found in "Fundamental Understanding of the Cycloidal-Rotor Concept for Micro Air Vehicle Applicaions" and "Development of Advanced Blade Pitching Kinematics for Cyclorotors and Cycloturbines." These dissertations include an extensive discussion of cyclorotor applications and aerodynamics.

For operation, cyclorotors require a mechanism to oscillate the blades in sync with cyclorotor rotation and vary this motion for control of thrust direction and magnitude. Cyclorotors must also incorporate a geared drivetrain to provide the high torque they require. This control system and drivetrain must be incorporated by a support structure that transmits the cyclorotor aerodynamic forces to the host vehicle.

This invention accomplishes these objectives in a way appropriate for a wide range of cyclorotor applications. It could be used in tandem with the inventor's prior awarded patent "Ring cam and ring cam assembly for dynamically controlling pitch of cycloidal rotor blades (U.S. Pat. No. 9,346,535 E1)" to provide more efficient cyclorotor control under a wide range of fluid speeds. The blade pitch control subsystem of this invention serves as an alternative to the inventor's patent application "Thrust vectoring control of a cyclorotor" (U.S. patent application Ser. No. 15/830,581).

Figure 1:
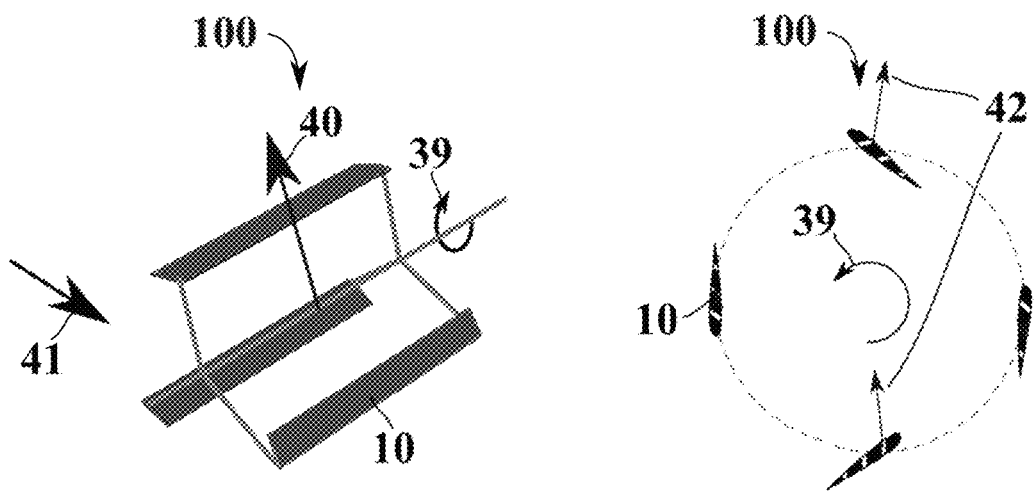
FIG. 1 shows a generic cyclorotor of the prior art and its means of producing thrust.
Figure 2:
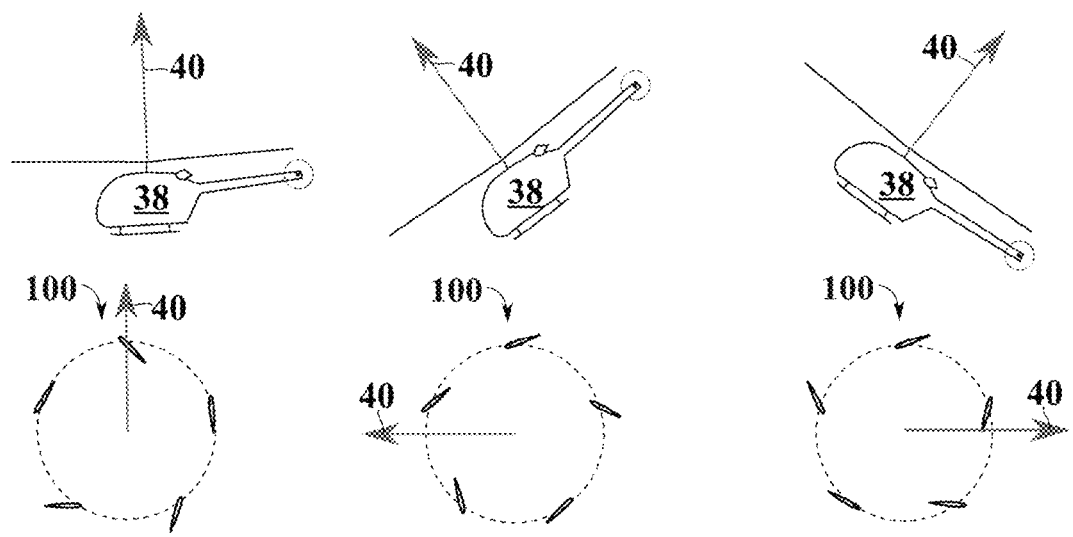
FIG. 2 shows that thrust vectoring of a traditional propeller requires reorienting the machine, whereas cyclorotors vector thrust by altering the blade pitching motion as known in the prior art.

To assist in the understanding of the present disclosure the following list of components and associated numbering found in the drawings is provided herein:

| Component | Number |
| --- | --- |
| Frame | 1 |
| Rotating pitch link | 2 |
| Eccentric bearing | 3 |
| Cam attach bracket | 4 |
| Central rotating shaft | 5 |
| Spoke | 6 |
| Blade pitch link | 7 |
| Pinned cam linear actuator | 8 |
| Fixed cam linear actuator | 9 |
| Cyclorotor blade | 10 |
| Blade shaft | 11 |
| Blade pitch link shaft | 12 |
| Blade pitch link bearing | 13 |
| Pinned connection of pitch link | 14 |
| Motor | 15 |
| Pinion gear | 16 |
| Main shaft gear | 17 |
| Main shaft bearing | 18 |
| Cyclorotor mounting bracket | 19 |
| Cyclorotor axis of rotation | 20 |
| Pinned connections of linear actuators | 21 |

-continued

| Component | Number |
| --- | --- |
| Rigid attach point for fixed cam linear actuator | 22 |
| Pinned attach point for pinned cam linear actuator | 23 |
| Magnet | 24 |
| Hall effect sensor | 25 |
| Hall effect sensor electrical conection | 26 |
| Microcontroller | 27 |
| Electronic speed control electrical connection | 28 |
| Pinned cam linear actuator electric control signal | 29 |
| Fixed cam linear actuator electric control signal | 30 |
| Pilot/system control signal | 31 |
| Zero displaced cam (No net thrust) | 32 |
| Cylootor with cam displaced down and to right (thrust generated up and left) | 33 |
| Cyclorotor with cam attach bracket displaced left (thrust generated right) | 34 |
| Cyclorotor with cam attach bracket displaced right (thrust generated left) | 35 |
| Cyclorotor with cam attach bracket displaced up (thrust generated down) | 36 |
| Cyclorotor with cam attach bracket displaced down (thrust generated up) | 37 |
| Traditional propulsion systems | 38 |
| Direction of cyclorotor rotation | 39 |
| Cyclorotor thrust | 40 |
| Air moving through cyclorotor from flight or wind | 41 |
| Cyclorotor blade aerodynamic lift | 42 |
| Cyclorotor blade shaft bearing | 43 |
| Longitudinal frame member | 44 |
| Electronic speed control | 45 |
| Cyclorotor aircraft fuselage | 46 |
| Quad-rotor cyclogyro | 47 |
| Twin-rotor cyclogyro | 48 |
| Cam | 49 |
| Cam following bearing | 50 |
| Linear Slider | 51 |
| Cyclorotor | 100 |
| Cyclorotor | 150 |

DETAILED DESCRIPTION

Figure 3:
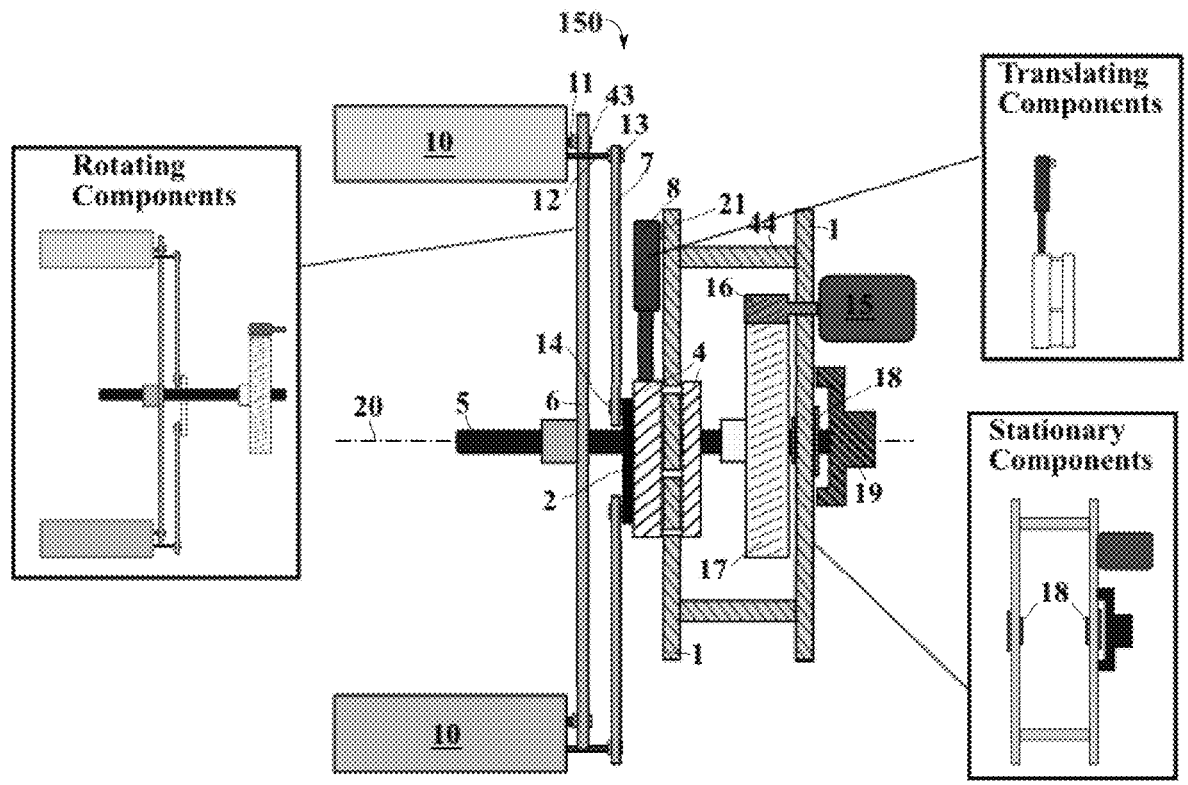
FIG. 3 shows a partial cross-sectional view of an embodiment the invention.
Figure 7:
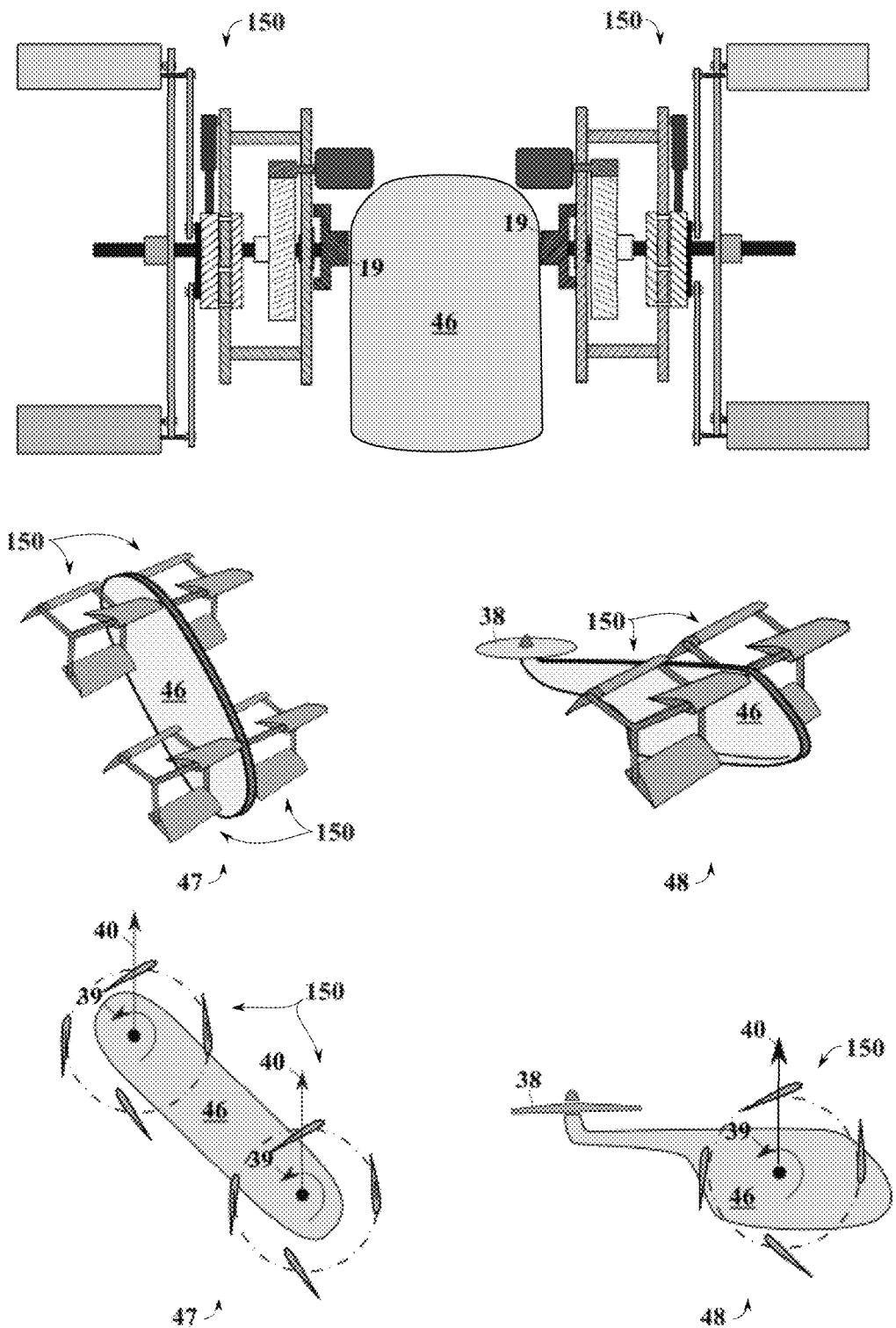
FIG. 7 shows how the cyclorotor mounting brackets attach the frame to a vehicle fuselage and two examples of cyclogyro aircraft in one embodiment of the invention.

Referring to FIG. 3, the components of this invention are supported on a frame 1. The frame 1 is composed of two parallel plus shaped pieces of material (see FIG. 5) that extend outward perpendicular to the cyclorotor axis of rotation. These plus-shaped frames 1 are connected by longitudinal frame members 44 to form a rigid skeleton. This rigid skeleton supports several stationary, rotating, and translating components as highlighted in the breakout blocks of FIG. 3. Main shaft bearings 18 are positioned at the center of each of these frames 1. These bearings hold the central rotating shaft 5 which extends through and out of one side of the frame 1. Referring to FIG. 3 and FIG. 7, this frame 1 is attached on the opposite side of the cyclorotor 150 to the cyclorotor aircraft fuselage 46 by a cyclorotor mounting bracket 19 or other means.

A motor 15 is attached to the frame 1 on the same side as the aircraft fuselage 46 and the motor shaft extends to the inside of the frame 1 and rotates a pinion gear 16. This pinion gear 16 meshes with a main shaft gear 17 connected to and centered on the central rotating shaft 5. This gearing provides the lower rotational speed, high torque power required to turn the cyclorotor 150 in the direction of cyclorotor rotation 39.

Figure 4:
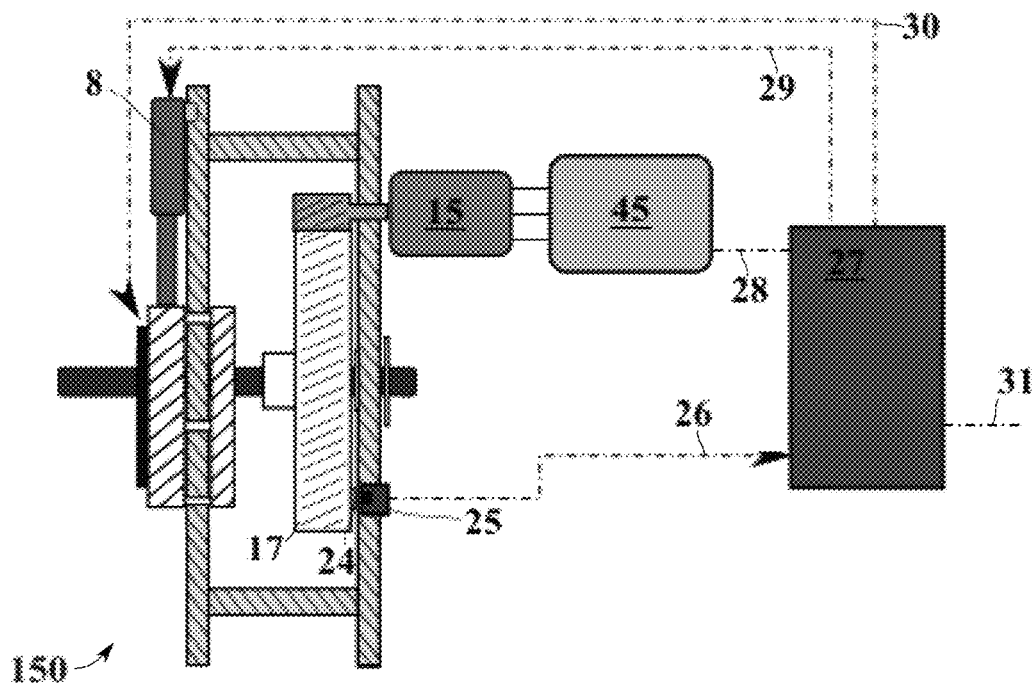
FIG. 4 shows a summary of the electronics controlling the linear actuators and motor in one embodiment of the invention.

Referring now to FIG. 4, digital feedback control loop is used to maintain the rotational speed of the cyclorotor 150. A magnet 24 is contained on the outer edge of this main shaft gear 17. Passage of this magnet 24 is counted by a hall effect sensor 25 mechanically connected to the frame 1 and electrically connected 26 to a microcontroller 27. The microcontroller 27 is also electrically connected 28 to the electronic speed control 45 for the motor 15. Software on the microcontroller 27 measures the rotational speed of the cyclorotor 150 via the hall effect sensor 25 and then modulates motor power through the electronic speed controller 45 to attain or maintain a desired cyclorotor rotational speed. Cyclorotor speed does not need to change in order to adjust cyclorotor thrust 40 magnitude.

Figure 5:
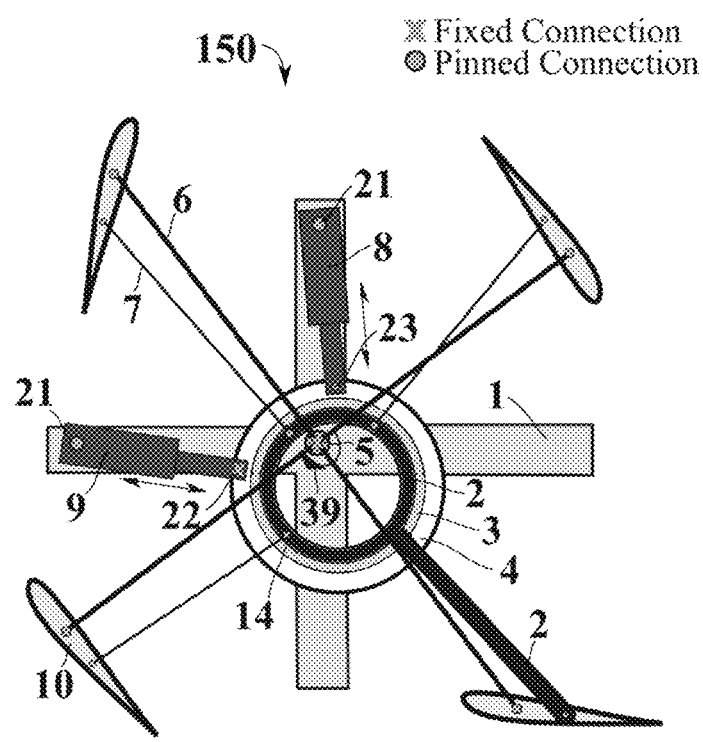
FIG. 5 shows the linear actuators and cam attach bracket that provides for altering cyclorotor blade pitch in one embodiment of the invention.

Referring now to FIGS. 3 and 5, opposite from the cyclorotor aircraft fuselage 46 the central rotating shaft 5 protrudes from the frame 1. One or more spokes 6 are rigidly attached to the central rotating shaft 5 and extend outward to just beyond the radius of the cyclorotor 150. Blade shaft bearings 43 at the tip of these spokes hold blade shafts 11 fastened in the blades 10. These blade shaft bearings 43 transmit the aerodynamic and centrifugal forces of the blades 10 to the spokes 6 while allowing the angle between the spokes 6 and the blades 10 (blade pitch) to be adjusted by a blade pitch link 7.

The pinned cam linear actuator 8 and fixed cam linear actuator 9 are connected to the frame by pinned connections 21. These actuators may be electro-mechanical, hydraulic, pneumatic, shape-memory alloy or pizo-electric depending on the application. Electromechanical and pizo-electric actators are appropriate for small aircraft. Hydraulic actuators are likely more appropriate on larger air and marine vehicles. Pneumatic actuators may also be appropriate on marine vehicles. Shape-memory alloy actuators may be best suited for micro-air vehicles. Other actuator types may also be appropriate.

The pinned cam linear actuator 8 and fixed cam linear actuator 9 are mounted on the same side of the frame 1 as the spokes 6 and oriented so that they extend inward from the outer edges of the frame 1 towards the cyclorotor axis of rotation 20. The axis of elongation of the pinned cam linear actuator 8 is generally perpendicular to the axis of elongation of the fixed cam linear actuator 9 and the cyclorotor axis of rotation 20. Both the pinned cam linear actuator 8 and fixed cam linear actuator 9 are connected to a cam attach bracket 4 on the side closest to the cyclorotor axis of rotation 20. The cam attach bracket 4 is manufactured so that it sandwiches the plus-shaped frame 1. The cam attach bracket 4 is thus permitted to slide freely in the plane perpendicular to the cyclorotor axis of rotation 20, but is constrained to prevent motion along the cyclorotor axis of rotation 20. The fixed cam linear actuator 9 is rigidly attached 22 to the cam attach bracket 4 so that the cam attach bracket 4 cannot rotate with respect to the fixed cam linear actuator 9. The pinned cam linear actuator 8 is attached to the cam attach bracket 4 via a pinned connection 23. A pinned connection allows free rotation about the joint, but constrains elongation and contraction. Extension of the pin cam linear actuator 8 translates the cam attach bracket 4, but prevents mechanical binding by allowing rotation of the cam attach bracket 4 relative to the pinned cam linear actuator 8.

Figure 6:
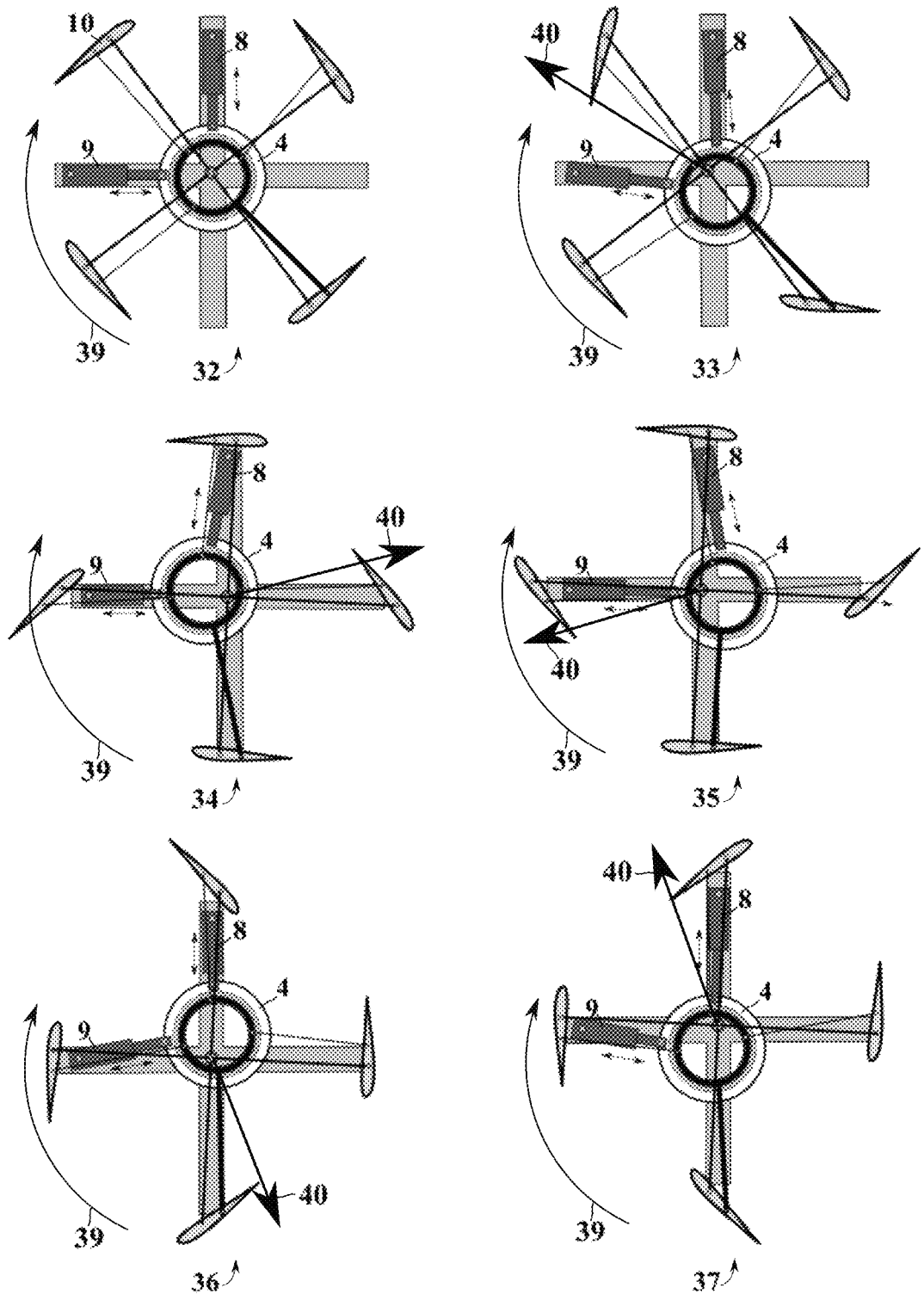
FIG. 6 shows how the linear actuators control the cam attach bracket position and consequently the cyclorotor blade pitch motion in one embodiment of the invention.

Referring now to FIG. 6, extension of the pinned cam linear actuator 8 and fixed cam linear actuators 9 in tandem translates the cam attach bracket 4 in the plane perpendicular to the cyclorotor axis of rotation 20. Referring to subfigure 34 of FIG. 6, retraction of the fixed cam linear actuator 9 translates the cam attach bracket 4 left. In turn this causes a change in the cyclorotor blade pitching motion (by way of a linkage system discussed above) and vectors cyclorotor thrust 40 generally right. Referring to subfigure 35 of FIG. 6, extension of the fixed cam linear actuator 9 moves the cam attach bracket 4 right, which results in a blade pitch motion that vectors cyclorotor thrust 40 generally left. Referring to subfigure 37 of FIG. 6, extension of the pinned cam linear actuator 8 displaces the cam attach bracket 4 downward causing a cyclorotor thrust 40 generally upward. Referring to subfigure 36 of FIG. 6, retraction of the pinned cam linear actuator 8 moves the cam attach bracket 4 upward and causes a cyclorotor thrust 40 generally downward. Simultaneous movement of the pinned cam linear actuator 8 and fixed cam linear actuator 9 can move the cam attach bracket 4 in plane allowing cyclorotor thrust 40 to be vectored a full 360 degrees. Subfigure 33 of FIG. 6 shows an example that simultaneous extension of of the pinned cam linear actuator 8 and fixed cam linear actuator 9 causes a cyclorotor thrust 40 generally up and to the left. Subfigure 32 of FIG. 6 shows a neutral position where there is no cyclorotor thrust 40.

Referring back to FIG. 4, a microcontroller 27 transforms an electric signal representing the desired cyclorotor thrust condition 31 into electrical signals 29, 30. Referring again to FIG. 6, these signals command the proper pinned cam and fixed cam linear actuators 8, 9 extensions which vector cyclorotor thrust 40 anywhere in the plane of cam attach bracket 4 motion. Thus, small adjustments to the pinned cam linear actuator 8 and fixed cam linear actuator 9 extension lengths rapidly vectors cyclorotor thrust 40.

Figure 8:
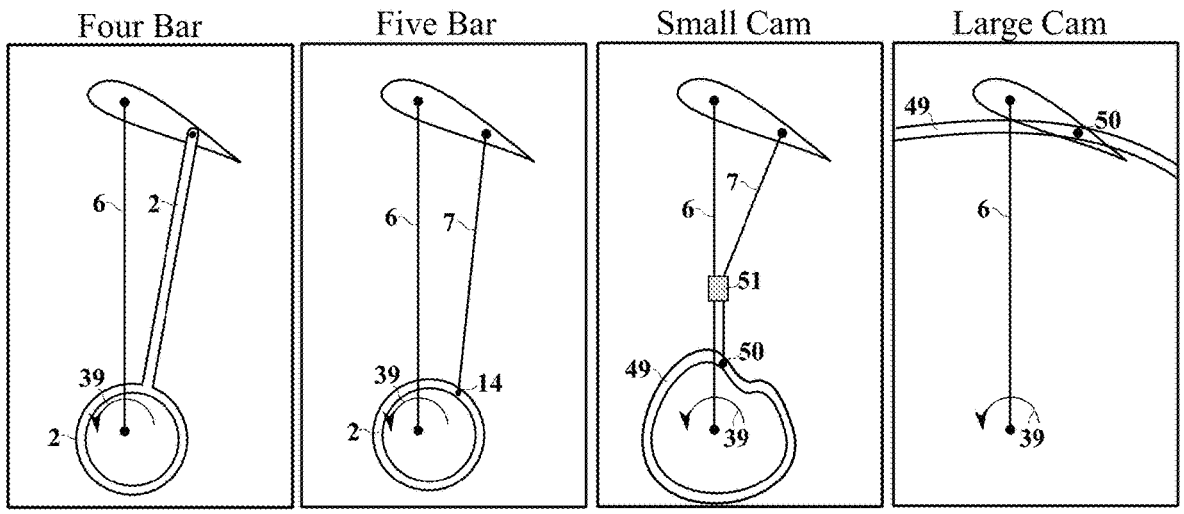
FIG. 8 is a flow chart of a method for controlling the thrust vector of a cyclorotor in one embodiment of the invention.

Referring to FIG. 8, translation of this cam attach bracket 4 can produce variation in blade pitching motion by a variety of existing designs. The only requirement is that the cyclorotor blade pitch vary pseudo-sinusoidally with displacement of the cam attach bracket 4 from the cyclorotor axis of rotation 20. Specifically, the radial displacement of the cam attach bracket 4 must proportionally increase the amplitude of cyclorotor blade pitching motion and the angle of this radial displacement must alter the phase of the pitching motion. Several implemented and proposed designs provide mechanisms to accommodate this task. In one method, which is known in the art, a cam 49 can be used in conjunction with a cam following bearing 50 and slider 51 as described in "Optimization of Vertical Axis Wind Turbine Blade Pitching Kinematics via Fluxline Theory with Experimental and Computational Verification." Alternatively, and also known in the art, a cam bearing 50 directly attached to the blade can follow a cam 49 similar in radius to the cyclorotor radius as described in "Design, Development, and Flight Test of a Small-Scale Cyclogyro UAV Utilizing a Novel Cam-Based Passive Blade Pitching Mechanism." Another design, also known in the art, is a 5-bar linkage system which is described in "Fundamental Understanding of the Cycloidal-Rotor Concept for Micro Air Vehicle Applicaions," where a pitch link 7 is attached to a rotating pitch link 2 via a pinned connection of pitch link 14. A further common design, known in the art, is a 4-bar linkage system, where all of the linkages are rotating pitch links 2, which is described in "Flow Field Studies on a MAV scale Cycloidal Rotor in Forward Fight". In each of these designs the cam 49 is fixed or the rotating pitch link 2 is allowed to rotate on the cam attach bracket 4. Moving the cam attach bracket 4 position in the plane perpendicular to the cyclorotor axis of rotation 20 moves the cam 49 or rotating pitch link 2, producing a pseudo-sinusoidal variation in blade pitching kinematics. Examples of how the cam attach bracket 4 position affects the blade pitching motion are shown in FIG. 6.

A simple mixed 4-bar and 5-bar linkage system appropriate for smaller-scale cyclorotors is pictured in FIGS. 3, 5, and 6. In this design variation, known in prior art, the cam attach bracket 4 holds an eccentric bearing 3 as shown in FIG. 5. This eccentric bearing 3 holds a single rotating pitch link 2 having an extension attached to one of the blades 10 forming a 4-bar linkage system. Rotation of the blade 10 attached to the rotating pitch link 2 also rotates the rotating pitch link 2 and the interior of the eccentric bearing 3. The remaining blade pitch links 7 are attached as near to the center of the rotating pitch link 2 as possible via a pinned connection 14. Thus only the rotating pitch link 2 rotates the eccentric bearing 3, and the remaining pitch links 7 will produce a pitch motion closely approximating that of the rotating pitch link 2. The blade pitch links 7 and the rotating blade pitch link 2 are attached to the cyclorotor blades 10 by a blade pitch link bearing 13 and blade pitch link shaft 12. This design obviates the need to have several heavy bearings attached to the cam attach bracket 4 as usually required on an exclusively 4-bar mechanism. The mixed 4-bar and 5-bar mechanism is also described in "The research on the performance of cyclogyro."

Figure 9:
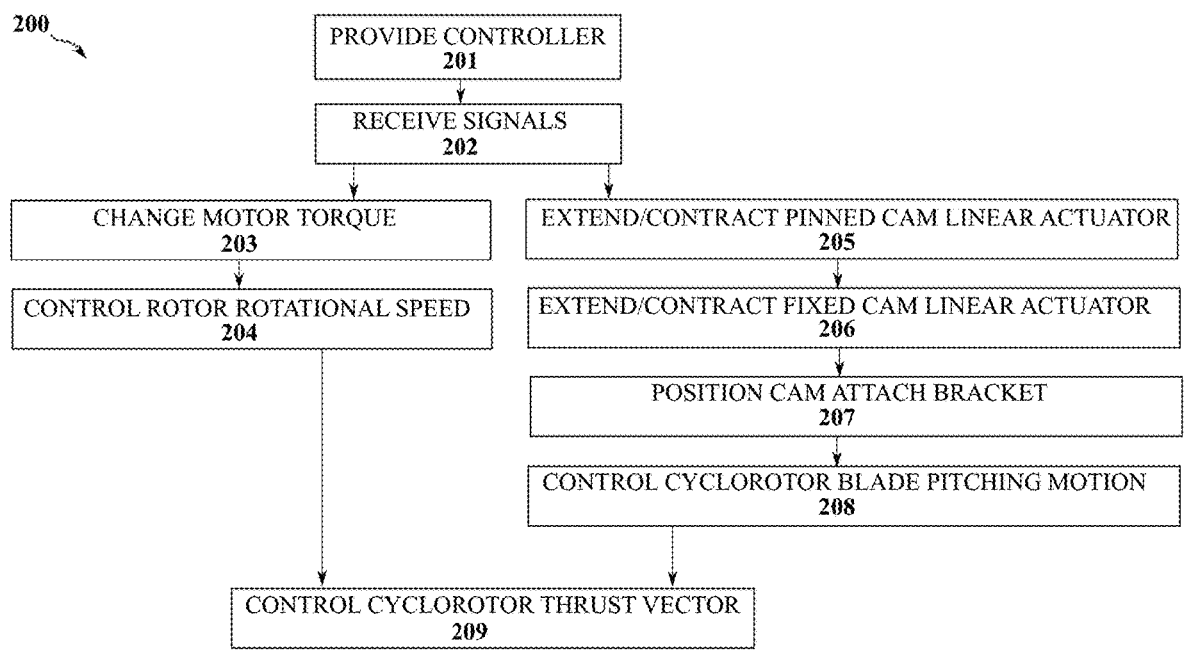
FIG. 9 shows a flowchart summarizing a method of controlling the thrust vector of a cyclorotor implementing the previously described mechanism.

FIG. 9 shows a flowchart summarizing a method 200 of controlling the thrust vector of a cyclorotor implementing the previously described mechanism. Understand that the process blocks displaying the steps in the method 200 may be accomplished separately, or simultaneously. As an example, both the pinned cam linear actuator 205 and the fixed cam linear actuator 206 may be extended/contracted in tandem to position the cam attach bracket 207.

The method 200 may provide a controller 201 possessing a processor and memory. This controller may read signals 202 that includes sensor inputs that observe the current state of the pinned cam and fixed cam linear actuators 8, 9 (position, velocity, etc), from the motor 15, and from the hall effect sensor 25. It may also read signals 202 from other sensors including environmental sensors. Environmental sensors may include pitot-static velocity, hotwire velocity, temperature, pressure, humidity, dewpoint, and other instruments. The controller may also receive signals 202 from a pilot or autopilot. The controller may implement feedback control to vary the cam attach bracket 4 position based on input of these signals 202 to achieve a desired cyclorotor thrust 40.

The controller may extend/contract the pinned cam linear actuator 205 and extend/contract the fixed cam linear actuator 206 in order to position the cam attach bracket 207. Positioning the cam attach bracket controls the cyclorotor blade pitching motion 208 by varying the amplitude and phase of the pitching motion. In concert with control of cyclorotor rotational speed 204, controlling the cyclorotor blade pitching motion 208, controls the cyclorotor thrust vector 209.

The controller may also change the motor torque 203 in order to control the cyclorotor rotational speed 204. For instance, the commanded motor torque may be increased to maintain a constant cyclorotor rotational speed when the pinned cam linear actuator 8 is extended, which increases cyclorotor thrust 40 and aerodynamic torque on the cyclorotor 150. The controller may also vary cyclorotor rotational speed 204 to increase or decrease cyclorotor thrust 40 without varying the cam attach bracket position. In one example, the cyclorotor rotational speed might be increased to provide more thrust when the cam attach bracket 4 is already displaced to the maximum thrust position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method for controlling a cyclorotor thrust of a cyclorotor, the method comprising the steps of:
   (a) receiving at least one of a plurality of control signals in at least one of a first cam linear actuator and a second cam linear actuator of the cyclorotor;
   (b) actuating by way of receiving step (a) at least one of the first cam linear actuator and the second cam linear actuator; and
   (c) positioning by way of actuating step (b) a cam attach bracket for controlling a cyclorotor blade pitching motion by varying the amplitude and phase of the pitching motion and thus controlling a cyclorotor thrust.

2. The method according to claim 1 further comprising the steps of:
   providing a microcontroller for the cyclorotor;
   reading by the microcontroller a plurality of signals received from a plurality of sources; and
   sending by the microcontroller the plurality of control signals to the at least one of the first cam linear actuator and the second cam linear actuator.

3. The method according to claim 2 further comprising the steps of:
   receiving at least one of the plurality of control signals in a motor; and
   changing a motor torque of the motor for controlling a rotational cyclorotor speed and thus controlling a cyclorotor thrust.

4. The method according to claim 3 wherein the reading step further comprises at least one of the steps of:
   reading a first signal indicating a current state of the first cam linear actuator;
   reading a second signal indicating a current state of and the second cam linear actuator;
   reading a third signal indicating a current state of the motor;
   reading a fourth signal indicating a current rotational speed of the cyclorotor;
   reading a fifth signal from an environmental sensor;
   reading a sixth signal from a pilot; and
   reading a seventh signal from an autopilot.

5. The method according to claim 4 further comprising the step of:
   reading a current state of a rotational speed sensor in order to determine the current rotational speed of the cyclorotor.

6. The method according to claim 1 wherein actuating step (b) further comprises at least one of the steps of:
   extending or contracting the first cam linear actuator; and
   extending or contracting the second cam linear actuator.

7. The method according to claim 1 wherein the actuating step (b) further comprises the steps of:
   actuating the first cam linear actuator at a first end with a pinned connection to a frame and at a second end of the first cam linear actuator with a pinned connection to the cam attach bracket; and
   actuating the second cam linear actuator at a first end with a pinned connection to a frame and at a second end of the second cam linear actuator with a rigid connection to the cam attach bracket.

8. The method according to claim 7 wherein the actuating step (b) further comprises the step of:
   sliding freely the cam attach bracket over the frame in a plane perpendicular to a cyclorotor axis of rotation.

9. The method according to claim 1 further comprising the step of:
   connecting a plurality of cyclorotor blades by way of a linkage system to a central rotating shaft and to the cam attach bracket.

10. The method according to claim 9 wherein the linkage system is a mixed 4-bar and 5-bar linkage system.

11. A device that controls a cyclorotor thrust of a cyclorotor, the device comprising:
   a cam attach bracket slidably movable against a frame in a plane perpendicular to a cyclorotor axis of rotation;
   a first cam linear actuator pinned to the frame at a first end and pinned to the cam attach bracket at a second end;
   a second cam linear actuator pinned to the frame at a first end and fixed to the cam attach bracket at a second end, wherein an axis of elongation of the first cam linear actuator is generally perpendicular to an axis of elongation of the second cam linear actuator;
   a central rotating shaft rotating around the cyclorotor axis of rotation;
   a plurality of cyclorotor blades;
   a linkage system to connect the plurality of cyclorotor blades to the central rotating shaft and to the cam attach bracket; and
   a motor for rotating the central rotating shaft in cooperation with the actuation of at least one of the first cam linear actuator and the second cam linear actuator causing a pitch of the plurality of cyclorotor blades to change allowing for control of the cyclorotor thrust of the cyclorotor.

12. The device according to claim 11 wherein the linkage system further comprises a mixed 4-bar and 5-bar linkage system.

13. The device according to claim 11 further comprising:
   a plurality of spokes each pinned at an outer end to a one of the plurality of cyclorotor blades and each fixed at an inner end to the central rotating shaft;
   a plurality of blade pitch links pinned at an outer end to the plurality of cyclorotor blades and pinned at an inner end to the cam attach bracket;
   an eccentric bearing held by the cam attach bracket; and
   a rotating pitch link held by the eccentric bearing, the rotating pitch link having an extension pinned to a one of the plurality of cyclorotor blades.

14. The device according to claim 11 further comprising:
   a microcontroller that reads a plurality of signals from a plurality of sources and sends a plurality of control signals to at least one of the first cam linear actuator and the second cam linear actuator and the motor.

15. The device according to claim 14 wherein the plurality of signals from the plurality of sources are selected from the group consisting of:
   a first signal indicating a current state of the first cam linear actuator;
   a second signal indicating a current state of and the second cam linear actuator;
   a third signal indicating a current state of the motor;
   a fourth signal indicating a current rotational speed of the cyclorotor;
   a fifth signal from an environmental sensor;
   a sixth signal from a pilot; and
   a seventh signal from an autopilot.

16. The device according to claim 15 further comprising:
   a main shaft gear attached to the central rotating shaft;
   a magnet attached to the main shaft gear; and a hall effect sensor attached to the frame wherein reading the fourth signal from the hall effect sensor determines the current rotational speed of the cyclorotor.

17. The device according to claim 11 wherein the cam attach bracke sandwiches over the frame and slides freely over the frame in a plane perpendicular to a cyclorotor axis of rotation.

18. A cyclorotor comprising:
a frame having a first half and a second half connected by at least two longitudinal frame members that form a rigid skeleton;
a first main shaft bearing attached to the first half of the frame and a second main shaft bearing attached to the second half of the frame;
a central rotating shaft secured between the first main shaft bearing and the second main shaft bearing, the central rotating shaft rotates about a cyclorotor axis of rotation;
a cam attach bracket slidably movable against the first half of the frame in a plane perpendicular to the cyclorotor axis of rotation;
a first cam linear actuator pinned to the frame at a first end and pinned to the cam attach bracket at a second end:
a second cam linear actuator pined to the frame at a first end and fixed to the cam attach bracket at a second end, wherein an axis of elongation of the first cam linear actuator is generally perpendicular to an axis of elongation of the second cam linear actuator;
a main shaft gear mounted on the central rotating shaft within the frame and between the first main shaft bearing and the second main shaft bearing;
a plurality of cyclorotor blades mounted on a first side of the frame;
a linkage system to connect the plurality of cyclorotor blades to the central rotating shaft and to the cam attach bracket;
a motor mounted on a second side of the frame that is opposite the first side of the frame; and
a pinion gear located within the frame and connected to the motor, the pinion gear meshing with the main shaft gear.

19. The cyclorotor according to claim 18 further comprising:
a cyclorotor mounting bracket located on the second side of the frame for attaching the cyclorotor to a cyclorotor aircraft fuselage, the central rotating shaft transfers cyclorotor thrust to the cyclorotor aircraft fuselage.

20. The cyclorotor according to claim 19 further comprising:
a microcontroller that reads a plurality of signals from a plurality of sources and sends a plurality of control signals to at least one of the first cam linear actuator, the second cam linear actuator, and the motor.

* * * * *